United States Patent [19]

Stultz

[11] Patent Number: 5,340,164
[45] Date of Patent: Aug. 23, 1994

[54] PIPE TO CONCRETE TRANSITION

[75] Inventor: Jeffrey H. Stultz, Freeport, Tex.

[73] Assignee: The Dow Chemical Company, Midland, Mich.

[21] Appl. No.: 55,153

[22] Filed: Apr. 29, 1993

[51] Int. Cl.$^5$ .................................................. F16L 41/06
[52] U.S. Cl. .................................... 285/158; 285/189; 405/52; 52/220.8
[58] Field of Search ................. 285/64, 158, 189, 368; 405/52, 53; 52/220, 220.8, 21

[56] References Cited

U.S. PATENT DOCUMENTS

| | | | |
|---|---|---|---|
| 1,210,217 | 12/1916 | Schodde | 52/220.8 |
| 1,881,913 | 10/1932 | Parker. | |
| 1,932,427 | 10/1933 | Stone. | |
| 3,563,574 | 2/1971 | Jackson et al. | 285/187 |
| 3,715,958 | 2/1973 | Crawford et al. | 52/21 |
| 3,977,709 | 8/1976 | Hatzis | 285/368 |
| 4,002,358 | 1/1977 | Streit | 285/137 R |
| 4,019,760 | 4/1977 | Streit | 285/158 X |
| 4,453,354 | 6/1984 | Harbeke | 285/64 X |
| 4,507,842 | 4/1985 | Werner | 29/451 |
| 4,711,474 | 12/1987 | Patrick | 285/332.3 |
| 4,714,377 | 12/1987 | Sandt et al. | 405/154 |
| 4,796,899 | 1/1989 | Herrick et al. | 277/228 |
| 4,802,792 | 2/1989 | Flessas | 405/52 X |
| 4,850,385 | 7/1989 | Harbeke | 285/64 X |
| 4,953,235 | 9/1990 | Cornwall | 285/64 X |
| 5,141,260 | 8/1992 | Burwell | 405/52 X |
| 5,152,635 | 10/1992 | Ziu | 405/52 |
| 5,154,453 | 10/1992 | Nishio | 285/342 |

OTHER PUBLICATIONS

"Texas Oprerations Wastewater Treatment Plant Dow U.S.A." Mar. 1992.

Primary Examiner—Randolph A. Reese
Assistant Examiner—Heather Chun

[57] ABSTRACT

A pipe-to-concrete transition apparatus is disclosed which, in on aspect, includes a flanged end of an HDPE pipe held in sealing contact with a flanged end of an FRP connection by a steel joining assembly, all encased in concrete of a concrete sump, the FRP connection having an outlet in fluid communication with the sump's internal bore. In one aspect an FRP layer covers the FRP-connection-to-sump interface and the steel connection assembly anchors the pipe in the concrete.

18 Claims, 1 Drawing Sheet

PIPE TO CONCRETE TRANSITION

BACKGROUND OF THE INVENTION

1. Field of the Invention

This invention relates to pipe-to-concrete transitions and, in one aspect, to high density polyethylene ("HDPE") pipe-to-concrete sump transitions.

2. Description of Related Art

The prior art discloses the use of a polyethylene ring welded to HDPE pipe as an anchor for pipe in concrete and to serve as a water stop. This apparatus is prone to leakage at the pipe-concrete interface and around the anchor ring. There has long been a need for an effective pipe-to-concrete transition, particularly for HDPE pipe-to-concrete transitions. There has long been a need for such transitions which inhibit or prevent leakage. There has long been a need for such transitions for pipe carrying dangerous materials or chemicals.

SUMMARY OF THE PRESENT INVENTION

In one aspect the present invention discloses a leak-inhibiting, and preferably leak-free, pipe-to-concrete transition in which a liquid from a pipe flows into a shotcrete or concrete sump or vessel. In one aspect a high density polyethylene pipe ("HDPE") has an HDPE flanged end secured thereto or formed integrally thereof. A portion of the concrete of the concrete sump surrounds and encases the flanged end of the HDPE pipe. A flanged connection made, e.g. from fiberglass reinforced plastic material ("FRP"), has an FRP flange which abuts the HDPE flange. A gasketed joint connector including steel backing rings bolted together encompasses both the FRP flange and the HDPE flange; tightening the bolts secures the two flanges sealingly together. Concrete encases the connector and both flanges. Optionally, a layer of FRP can be applied at the outlet of the FRP connection into the sump, which layer extends from within the FRP connection and along an interior surface of the concrete sump. The FRP layer is bonded to the concrete with conventional bonding materials, e.g. but not limited to, catalyzed resin bonding systems.

It is, therefore, an object of at least certain preferred embodiments of the present invention to provide:

New, useful, unique, efficient, non-obvious leak free pipe-to-concrete transitions;

Such devices which are useful for HDPE pipe-to-concrete sump transitions;

Such devices including an HDPE pipe flange sealingly joined to an FRP connection flange with a steel backing ring gasketed connection, all encased in concrete of the sump;

Such devices including a leak inhibiting FRP layer extending from within the FRP connection to the interior of the concrete sump and bonded thereto; and Such devices which anchor the HDPE pipe in the concrete in a leak-inhibiting or leak-free manner.

This invention resides, in certain embodiments, not in any particular individual feature, but in combinations of them herein disclosed and claimed and it is distinguished from the prior art in these combinations with their structures and functions.

There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter of the claims appended hereto. Those skilled in the art will appreciate that the conceptions, upon which this disclosure is based, may readily be utilized as a basis for the designing of other structures, methods and systems for carrying out the purposes of the present invention. It is important, therefore, that the claims be regarded as including any legally equivalent constructions insofar that do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED AT THE TIME OF FILING FOR THIS PATENT

Figure 1:
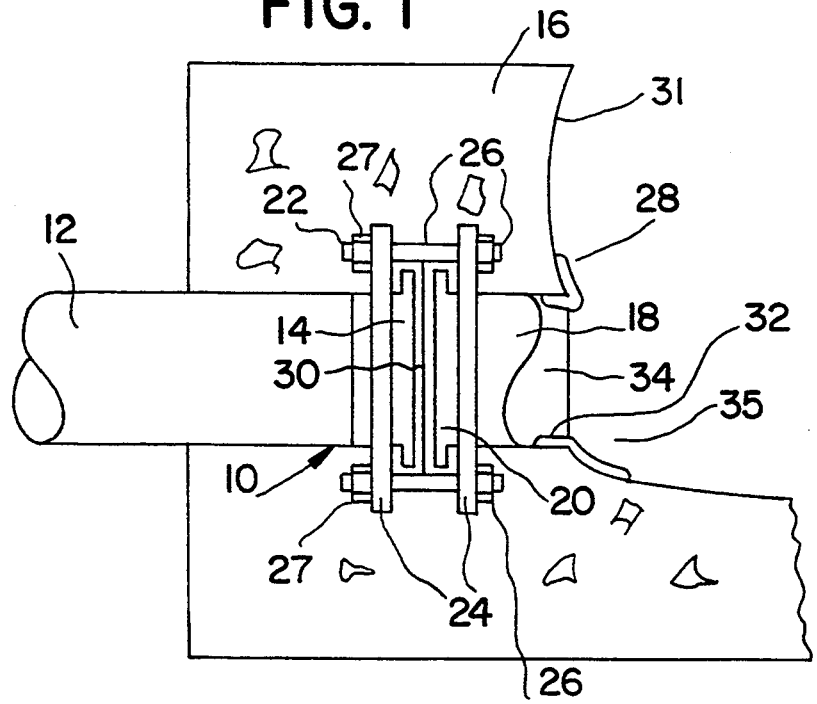
FIG. 1 is a side cross-sectional view of a transition according to the present invention.

Referring now to FIG. 1, a leak-free transition 10 according to the present invention includes a concrete sump 16, a flanged HDPE pipe 12, a flanged connection 18, preferably made from FRP, and a joining assembly 22. The HDPE pipe 12 has a flange 14 which abuts a flange 20 of the FRP connection 18. The steel joining assembly 22 has steel backing rings 24 which are bolted together with bolts 26 and nuts 27 to bring the two flanges into sealing contact. A gasket 30 enhances the seal between the two flanges and, preferably, is made of material compatible with fluid to flow through the pipe. One gasket is made of rubber. The flanged connection 18 and the joining assembly 22 may be made of steel, stainless steel, or concrete. The flange 20 is referred to as a "stub end" and the steel backing rings are referred to as lap joint flanges.

As shown in FIG. 1, the FRP connection 18, its flange 20, a portion of the HDPE pipe 12, its flange 14, and the steel joining assembly 22 are encased in and surrounded by a portion of the concrete of the concrete sump 16. It is preferred that a material sealing layer 28 of, e.g. a plastic coating such as FRP, be bonded to an interior 32 of the FRP connection near its outlet 34 and extend over a portion of an interior surface 31 of the concrete sump 16 to which it is also bonded for further leak inhibition. The outlet 34 opens to a recess or a space 35 in the sump 16. The space 35 may be in fluid communication with other pipes, etc. Encasement of the transition 10 serves to anchor the HDPE pipe.

Figure 2:
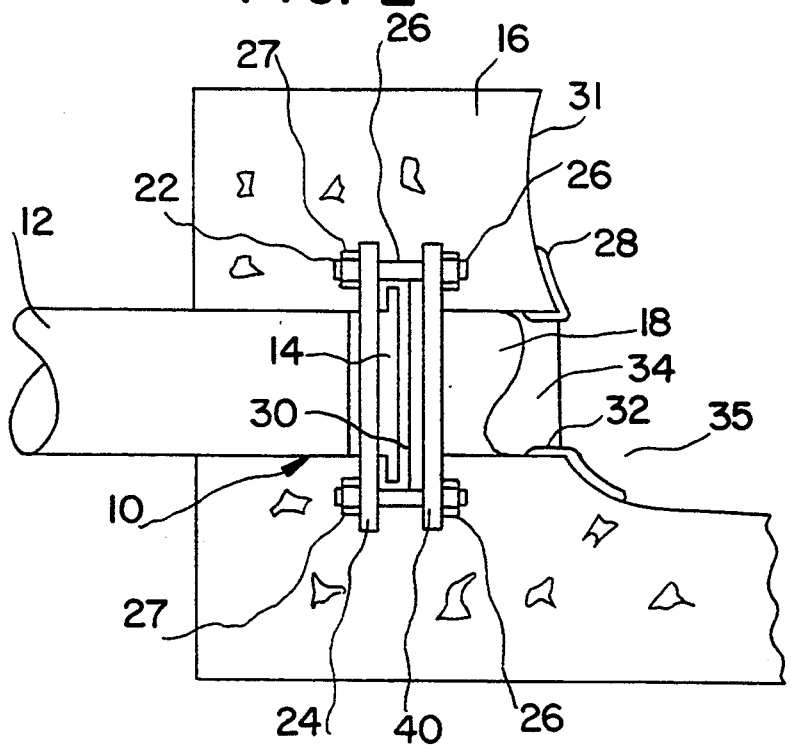
FIG. 2 is a side cross-sectional view of a transition according to the present invention.

It is within the scope of this invention to delete one of the backing rings 24 (the one over the connection 18) and to use a connection 18 with a flange 40 corresponding to the other backing ring as shown in FIG. 2. In the embodiment of FIG. 2, the connection assembly 22 is disposed about the pipe flange 14 and is secured with bolts 26 and nuts 27 to the transition flange 40, thereby holding the pipe 12 and the connection 18 together. Similar numerals in FIGS. 1 and 2 indicate similar items.

Filed on even date herewith are the following applications, co-owned with this application, whose subject matter is hereby disclosed herein and which may be employed with the present invention in a material treatment system (invention titles followed by applicant(s) name):

Sludge Digestion; U.S. Ser. No. 08/055,159; J. Stultz, D. Bice;
Sludge Ammonia Removal; U.S. Ser. No. 08/055,158; J. Stultz, D. Bice;
Sludge Deodorization; U.S. Ser. No. 08/055,153; J. Stultz, D. Bice;
Tank Foundation; U.S. Ser. No. 08/055,152 J. Stultz;
Slab Joint Liquid Stop; U.S. Ser. No. 08/055,156; J. Stultz;
Sludge Clarifier Bottom; U.S. Ser. No. 08/055,161; J. Stultz, H. Rabren;
Sludge Clarifier Roof; U.S. Ser. No. 08/055,154; J. Stultz;
Hopper Liner; U.S. Ser. No. 08/055,155; J. Stultz;
Waste Gas Incineration; U.S. Ser. No. 08/055,160; J. Stultz, D. Bice In conclusion, therefore, it is seen that the present invention and the embodiments disclosed herein and those covered by the appended claims are well adapted to carry out the objectives described and obtain the ends set forth. Certain changes can be made in the described and in the claim subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A pipe-to-concrete transition comprising
a hollow first pipe having a first pipe end and a second pipe end, the first pipe end having a pipe flange,
a hollow transition pipe having a first transition end and a second transition end, the first transition end having a transition flange for mating with the pipe flange,
a connection assembly disposed about and securing together the pipe flange and the transition flange, the first pipe in fluid communication with the transition pipe,
a concrete mass enclosing and disposed about the first pipe end, the first transition end, and the connection assembly, and
the second transition end in fluid communication with a space within the concrete mass and the second pipe end disposed outside of the concrete mass.

2. The transition of claim 1 comprising also
gasket means between the pipe flange and the transition flange to enhance a seal therebetween.

3. The transition of claim 1 comprising also
a layer of sealing material bonded to an interior of the first transition end and extending to and bonded to a portion of a wall defining the space within the concrete mass.

4. The transition of claim 3 wherein the sealing material is plastic.

5. The transition of claim 3 wherein the sealing material is

6. The transition of claim 1 comprising also
the connection assembly comprises
two opposed backing rings bolted together with bolts extending through each ring and secured together with nuts.

7. The transition of claim 1 comprising also
a recess in the concrete mass defined by an interior wall thereof and in fluid communication with the first transition end.

8. The transition of claim 1 wherein the connection assembly anchors the first pipe in the concrete mass.

9. A pipe-to-concrete transition comprising
a hollow first pipe having a first pipe end and a second pipe end, the first pipe end having a pipe flange,
a hollow transition pipe having a first transition end and a second transition end, the first transition end having a transition flange for mating with the pipe flange,
a connection assembly disposed about and securing together the pipe flange and the transition flange, the connection assembly comprising two opposed backing rings bolted together with bolts extending through each ring and secured with nuts, the connection assembly anchoring the first pipe in the concrete mass,
a concrete mass enclosing and disposed about the first pipe end, the first transition end, and the connection assembly,
the second transition end in fluid communication with a space within the concrete mass and the second pipe end disposed outside of the concrete mass,
gasket means between the pipe flange and the transition flange to enhance a seal therebetween, and
a layer of plastic sealing material bonded to an interior of the first transition end and extending to and bonded to a portion of a wall defining the space within the concrete mass.

10. A pipe-to-concrete transition comprising
a hollow first pipe having a first pipe end and a second pipe end, the first pipe end having a pipe flange, a hollow transition pipe having a first transition end and a second transition end, the first transition end having a transition flange, a connection assembly disposed about the pipe flange and secured to the transition flange thereby holding the first pipe's first pipe end against the transition pipe's first transition end, a concrete mass enclosing and disposed about the first pipe end, the first transition end, and the connection assembly, the first pipe in fluid communication with the transition pipe, and the second transition end in fluid communication with a space within the concrete mass and the second pipe end disposed outside of the concrete mass.

11. The transition of claim 10 comprising also gasket means between the pipe flange and the transition flange to enhance a seal therebetween.

12. The transition of claim 10 comprising also a layer of sealing material bonded to an interior of the first transition end and extending to and bonded to a portion of a wall defining the space within the concrete mass.

13. The transition of claim 12 wherein the sealing material is plastic.

14. The transition of claim 12 wherein the sealing material is FRP.

15. The transition of claim 10 comprising also the connection assembly comprises a backing ring boltable with bolts extending through the ring and through the transition flange, the bolts secured with nuts.

16. The transition of claim 10 comprising also a recess in the concrete mass defined by an interior wall thereof and in fluid communication with the first transition end.

17. The transition of claim 10 wherein the connection assembly anchors the first pipe in the concrete mass.

18. A pipe-to-concrete transition comprising a hollow first pipe having a first pipe end and a second pipe end, the first pipe end having a pipe flange, a hollow transition pipe having a first transition end and a second transition end, the first transition end having a transition flange for mating with the pipe flange, a connection assembly disposed about the pipe flange and secured to the transition flange, the connection assembly comprising a backing ring boltable with bolts extending through the ring and through the transition flange, the bolts secured with nuts, a concrete mass enclosing and disposed about the first pipe end, the first transition end, and the connection assembly, the connection assembly anchoring the first pipe in the concrete mass, the second transition end in fluid communication with a space within the concrete mass and the second pipe end disposed outside of the concrete mass, gasket means between the pipe flange and the transition flange to enhance a seal therebetween, and a layer of plastic sealing material bonded to an interior of the first transition end and extending to and bonded to a portion of a wall defining the space within the concrete mass.

* * * * *